United States Patent
Liu et al.

(10) Patent No.: US 11,003,035 B2
(45) Date of Patent: May 11, 2021

(54) DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Hao Liu, Beijing (CN); Ruichen Zhang, Beijing (CN); Hongming Zhan, Beijing (CN); Kaixuan Wang, Beijing (CN); Feifei Wang, Beijing (CN); Bo Feng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/643,629

(22) PCT Filed: Aug. 29, 2019

(86) PCT No.: PCT/CN2019/103296
§ 371 (c)(1),
(2) Date: Mar. 2, 2020

(87) PCT Pub. No.: WO2020/043163
PCT Pub. Date: Mar. 5, 2020

(65) Prior Publication Data
US 2020/0292894 A1    Sep. 17, 2020

(30) Foreign Application Priority Data

Aug. 29, 2018   (CN) .......................... 201810997078.3

(51) Int. Cl.
*G02F 1/1362*   (2006.01)
*G02F 1/133*    (2006.01)
*G02F 1/13357*  (2006.01)

(52) U.S. Cl.
CPC .... *G02F 1/136286* (2013.01); *G02F 1/13306* (2013.01); *G02F 1/133606* (2013.01)

(58) Field of Classification Search
CPC ........... G02F 1/13306; G02F 1/133606; G02F 1/136286
See application file for complete search history.

(56) References Cited

U.S. PATENT DOCUMENTS 9,223,160 B2   12/2015   Nishimura et al.
9,507,197 B2   11/2016   Uchida et al.
(Continued)

FOREIGN PATENT DOCUMENTS

CN   102235607   11/2011
CN   103728749    4/2014
(Continued)

OTHER PUBLICATIONS

Chinese Patent Office Action dated Nov. 20, 2020 corresponding to Chinese Patent Application No. 201810997078.3; 16 pages.

*Primary Examiner* — Dung T Nguyen
(74) *Attorney, Agent, or Firm* — Leason Ellis LLP

(57) ABSTRACT

A display panel and a display device are provided. The display panel includes a display liquid crystal panel and a light control panel that are stacked; the display liquid crystal panel includes grid lines; the grid lines include first grid lines extending along a first direction and second grid lines extending along a second direction, the first direction intersect with the second direction; the first grid lines and the second grid lines define a plurality of sub-pixel units; the light control panel allows backlight to illuminate into the display liquid crystal panel through the light control panel, and includes signal lines; the signal lines include first signal lines extending along the first direction and second signal lines extending along the second direction; the first signal (Continued)

lines and the second signal lines define a plurality of light control units; at least part of the signal lines is a fold line.

20 Claims, 9 Drawing Sheets

(56) References Cited

U.S. PATENT DOCUMENTS

| | | |
|---|---|---|
| 10,216,348 B2 | 2/2019 | Koito et al. |
| 2005/0206814 A1 | 9/2005 | Histake |
| 2006/0290627 A1 | 12/2006 | Konno et al. |
| 2017/0090662 A1* | 3/2017 | Yang ........................ G06F 3/045 |

FOREIGN PATENT DOCUMENTS

| | | |
|---|---|---|
| CN | 104076995 | 10/2014 |
| CN | 106782382 | 5/2017 |
| CN | 108983463 | 12/2018 |

* cited by examiner

Display Image Under local
Dimming Technology

Brightness Of Backlight Blocks

10

Backlight

DISPLAY PANEL AND DISPLAY DEVICE

CROSS-REFERENCE

This application is a U.S. National Stage Application under 35 U.S.C. § 371 of International Patent Application No. PCT/CN2019/103296, filed Aug. 29, 2019, which claims priority of Chinese patent application No. 201810997078.3, filed on Aug. 29, 2018, both of which are incorporated by reference in their entireties.

TECHNICAL FIELD

At least one embodiment of the present disclosure relates to a display panel and a display device.

BACKGROUND

In a display panel, in the case where two stacked layers respectively have grid patterns, and the grid patterns of the two layers are similar to each other, moire fringe is easily generated, that is, human eyes observe alternating light and dark stripes, which affect visual experiences. Alleviating the phenomenon of the moire fringe so that the human eyes cannot observe the moire fringe is of great significance for improving the display quality of the display panel.

SUMMARY

At least one embodiment of the present disclosure provides a display panel, the display panel comprises a display liquid crystal panel and a light control panel that are stacked; the display liquid crystal panel comprises a plurality of grid lines, and the plurality of grid lines comprise a plurality of first grid lines extending along a first direction and a plurality of second grid lines extending along a second direction, the first direction intersects with the second direction, and the plurality of first grid lines and the plurality of second grid lines define a plurality of sub-pixel units; the light control panel is configured to allow backlight to illuminate into the display liquid crystal panel through the light control panel, and comprises a plurality of signal lines; the plurality of signal lines comprise a plurality of first signal lines extending along the first direction and a plurality of second signal lines extending along the second direction, and the plurality of first signal lines and the plurality of second signal lines define a plurality of light control units; at least a part of the plurality of signal lines is a fold line.

For example, in the display panel provided by at least one embodiment of the present disclosure, each of the first signal lines is the fold line and comprises a plurality of first fold line units continuously and periodically arranged, the first fold line units are in one-to-one correspondence to the light control units, and each of the first fold line units comprises a first portion and a second portion sequentially arranged along the first direction, the first portion comprises a first terminal connected to the second portion, and the second portion comprises a first terminal connected to the first portion.

For example, in the display panel provided by at least one embodiment of the present disclosure, a connection point of the first portion and the second portion is an inflection point of the fold line, and the first portion and the second portion are respectively on two sides of the inflection point and respectively extend toward different directions.

For example, in the display panel provided by at least one embodiment of the present disclosure, an orthographic projection of an intersection point of the first signal line and the second signal line on a surface of the display liquid crystal panel facing the light control panel overlaps with an orthographic projection of the second grid line on the surface of the display liquid crystal panel facing the light control panel; an orthographic projection of a connection point of the first terminal of the first portion and the first terminal of the second portion of one of the first fold line units on the surface of the display liquid crystal panel facing the light control panel overlaps with an orthographic projection of one of the second grid lines on the surface of the display liquid crystal panel facing the light control panel.

For example, in the display panel provided by at least one embodiment of the present disclosure, N sub-pixel units of the plurality of sub-pixel units continuously arranged along the first direction constitute a pixel unit, and N is a positive integer; a plurality of pixel units and the plurality of light control units are respectively arranged in arrays; in the first direction, a maximum length of one light control unit of the plurality of light control units is m times of a length of one pixel unit of the plurality of pixel units; in the second direction, a width of one light control unit of the plurality of light control units is n times of a width of one pixel unit of the plurality of pixel units; and both m and n are positive integers.

For example, in the display panel provided by at least one embodiment of the present disclosure, an area of a planar pattern of one of the light control units is substantially equal to an area of a planar pattern of m×k pixel units of the plurality of pixel units, and k is a count of the pixel units that are continuously arranged in the second direction; k is a positive integer, and k≥n/2.

For example, in the display panel provided by at least one embodiment of the present disclosure, N sub-pixel units of the plurality of sub-pixel units continuously arranged along the first direction constitute a pixel unit, and N is a positive integer; both an orthographic projections of the first portion and an orthographic projection of the second portion on a surface of the display liquid crystal panel facing the light control panel pass through at least two pixel unit rows continuously arranged in the second direction.

For example, in the display panel provided by at least one embodiment of the present disclosure, a whole constituted by orthographic projections of the plurality of first signal lines on the surface of the display liquid crystal panel facing the light control panel passes through all the pixel units.

For example, in the display panel provided by at least one embodiment of the present disclosure, wherein an orthographic projection of one of the first signal lines on the surface of the display liquid crystal panel facing the light control panel intersects with an orthographic projection of one of the plurality of first grid lines on the surface of the display liquid crystal panel facing the light control panel, and a midpoint of the first portion and a midpoint of the second portion of the first fold line unit overlap with the one of the plurality of first grid lines in a direction perpendicular to the surface of the display liquid crystal panel facing the light control panel.

For example, in the display panel provided by at least one embodiment of the present disclosure, the first portion and the second portion of at least one of the plurality of first fold line units are symmetrical with respect to a symmetry axis along the second direction.

For example, in the display panel provided by at least one embodiment of the present disclosure, the first portion has a first angle with the first direction, and the second portion has a second angle with the first direction, both the first angle and the second angle range from 37° to 70°.

For example, in the display panel provided by at least one embodiment of the present disclosure, the first portion is a straight section or a curved section, and the second portion is a straight section or a curved section.

For example, in the display panel provided by at least one embodiment of the present disclosure, each of the second signal line is the fold line and comprises a plurality of second fold line units periodically arranged, one of the second fold line units corresponds to one of the light control units, or one of the second fold line units corresponds to two of the light control units; each of the second fold line units comprises a first portion and a second portion sequentially arranged along the second direction, and the first portion of the second fold line unit comprises a first terminal connected to the second portion of the second fold line unit, and the second portion of the second fold line unit comprises a first terminal connected to the first portion of the second fold line unit.

For example, in the display panel provided by at least one embodiment of the present disclosure, the first portion and the second portion of at least one of the plurality of second fold line units are symmetrical with respect to a symmetry axis along the first direction.

For example, in the display panel provided by at least one embodiment of the present disclosure, the first portion of the second fold line unit has a third angle with the second direction, the second portion of the second fold line unit has a fourth angle with the second direction, and both a range of the third angle and a range of the fourth angle are less than 7°.

For example, in the display panel provided by at least one embodiment of the present disclosure, an orthographic projection of one of the second signal lines on a surface of the display liquid crystal panel facing the light control panel intersects with an orthographic projection of one of the plurality of second grid lines on the surface of the display liquid crystal panel facing the light control panel, and a second terminal of the first portion of the second fold line unit and a second terminal of the second portion of the second fold line unit overlap with the one of the plurality of second grid lines in a direction perpendicular to the surface of the display liquid crystal panel facing the light control panel.

For example, in the display panel provided by at least one embodiment of the present disclosure, wherein each of the second signal line is a straight line, an orthographic projection of each of the second signal lines on a surface of the display liquid crystal panel facing the light control panel overlaps with an orthographic projection of a corresponding one of the second grid lines on the surface of the display liquid crystal panel facing the light control panel.

For example, in the display panel provided by at least one embodiment of the present disclosure, a width of each of the first signal lines in the second direction is larger than a width of each of the second signal lines in the first direction.

For example, in the display panel provided by at least one embodiment of the present disclosure, each of the first signal line is a first gate line, the second signal line is a first data line, and each of the first gate line and the first data line are respectively configured to provide a first gate signal and a first data signal that are used for driving liquid crystal molecules in the light control units of the light control panel to rotate; the grid lines comprise a second grid line and a second data line, and the second grid line and the second data line are respectively configured to provide a second gate signal and a second data signal that are used for driving liquid crystal molecules in sub-pixel units of the display liquid crystal panel to rotate, or the grid lines comprise a black matrix.

For example, in the display panel provided by at least one embodiment of the present disclosure, the display liquid crystal panel comprises a first base substrate; the display liquid crystal panel and the light control panel share the first base substrate; the display liquid crystal panel comprises a display function layer, and the light control panel comprises a light control function layer; the display function layer is on a first side of the first base substrate, the light control function layer is on a second side of the first base substrate, and the second side is opposite to the first side.

For example, the display panel provided by at least one embodiment of the present disclosure further comprises an isotropic diffusion film (IDF) between the display liquid crystal panel and the light control panel, the isotropic diffusion film is configured to allow light emitted from the light control panel to be diffused isotropically by the isotropic diffusion film and then illuminate into the display liquid crystal panel.

At least one embodiment of the present disclosure provides a display device, the display device comprises a backlight unit and the display panel according to any one of embodiments of the present disclosure, the backlight unit is on a side of the display panel that is close to the light control panel.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

Figure 1A:
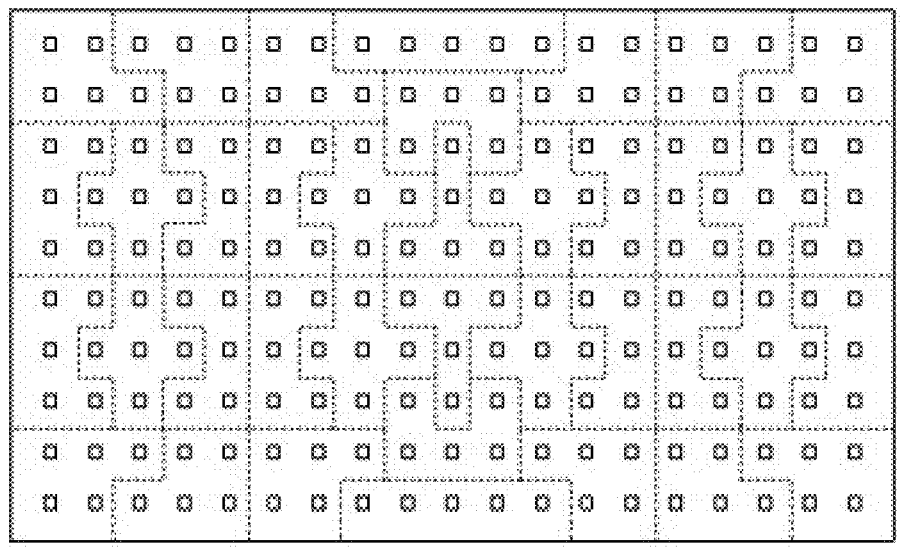
FIG. 1A and FIG. 1B illustrate schematic diagrams of local dimming.

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "in," "out," "on," "under" or the like are only used to indicate relative position relationship, and when the position of the object which is described is changed, the relative position relationship may be changed accordingly.

Dimensions of the drawings adopted by the present disclosure are not strictly drawn to the actual scale, and the number of pixel units in the display liquid crystal panel and the number of light control units in the light control panel are not limited to the number illustrated in the drawings. The specific size and number of each structure can be determined according to actual needs. The drawings described in the present disclosure are merely structural schematic diagrams.

A display liquid crystal panel comprises a liquid crystal panel and a backlight unit. Generally, the liquid crystal panel comprises an array substrate and an opposite substrate (such as a color filter substrate) disposed opposite to each other to form a liquid crystal cell. A liquid crystal layer is filled between the array substrate and the opposite substrate in the liquid crystal cell. A first polarizer is disposed on the array substrate, a second polarizer is disposed on the opposite substrate, and polarization directions of the first polarizer and the second polarizer are perpendicular to each other. The backlight unit is disposed on a non-display side of the liquid crystal panel, and is used to provide a planar light source for the liquid crystal panel. Liquid crystal molecules of the liquid crystal layer rotate under a driving electric field formed between a pixel electrode provided on the array substrate and a common electrode provided on the array substrate or a common electrode provided on the opposite substrate, so that the polarization direction of light is controlled. In addition, the transmittance of the light is controlled by the cooperation of the first polarizer and the second polarizer, thereby realizing grayscale display. The backlight unit may be a direct type backlight unit or a side-in type backlight unit. The direct type backlight unit comprises a plurality of point light sources (for example, LEDs) arranged in parallel and a diffusion plate. Light emitted by the point light sources is incident into the liquid crystal panel for display after being uniformized by the diffusion plate.

For example, for the display liquid crystal panel, the direct type backlight unit can be controlled by a local dimming (LD) technology, thereby improving the quality of a display image of the display panel. The local dimming technology can not only reduce the power consumption of the display panel, but also achieve dynamic dimming in a backlight region, thereby greatly improving the contrast of the display image and improving the quality of the display image of the display panel. Based on the local dimming technology, a peak driving technology can be used to further improve the contrast of the display image and provide better visual experiences for users.

The local dimming technology can divide the entire backlight unit into a plurality of backlight blocks that are driven individually, and each of the backlight blocks comprises one or more LEDs. According to gray levels that need to be displayed in different portions of a display image, driving currents of the LEDs of the backlight blocks corresponding to these portions are automatically adjusted, and the brightness of each portion of the backlight unit can be adjusted individually, thereby improving the contrast of the display image. For example, in an exemplary direct type backlight unit, a schematic diagram of region division of LED light sources in the entire backplane is illustrated in FIG. 1A. A small square in the figure represents one LED unit, and a plurality of regions separated by dashed lines represent a plurality of backlight regions. Each of the backlight regions comprises one or more LED units and can be controlled independently of other backlight regions. For example, the LEDs in each of the backlight regions are linked, that is, the same current passes through the LEDs in the same backlight region.

Figure 1B:
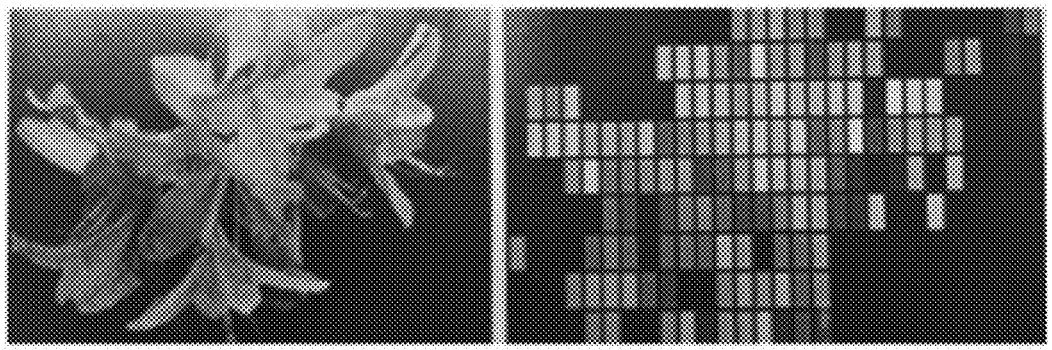

The local dimming technology can adjust the brightness of the corresponding backlight block according to the grayscale of the image content displayed by the liquid crystal display panel. FIG. 1B is a schematic diagram illustrating the display brightness of the display image and the backlight block corresponding to the display image after a local dimming process. As illustrated in FIG. 1B, the backlight unit comprises a plurality of rectangular backlight regions arranged in an array. The local dimming technology can adjust the brightness of the corresponding backlight block according to the grayscale of the image content displayed by the liquid crystal display panel. For the portion that the brightness (grayscale) of the image is higher, the brightness of the corresponding backlight block is higher, and for the portion that the brightness of the image is lower, the brightness of the corresponding backlight block is lower. Therefore, the purposes of reducing the backlight power consumption, improving the contrast of the display image, and enhancing the quality of the display image are achieved.

However, the above-mentioned local dimming technology is applicable to the direct type backlight unit, and the LEDs used as light sources are evenly distributed on the entire backplane, for example. In order to apply the local dimming technology to, for example, a side-in type backlight unit, it is necessary to add a light control panel between the display liquid crystal panel and the side-in type backlight unit. The light control panel can control the light transmittance in a predetermined region. For a portion of the display image in which the brightness (grayscale) is higher, the light transmittance of the a region, corresponding to this portion of the display image, of the light control panel is also higher, so as to allow more light emitted from the backlight unit to pass through this portion of the light control panel; for a portion of the display image in which the brightness of the image is lower, the light transmittance of a region, corresponding to this portion of the display image, of the light control panel is also lower, so as to allow less light emitted from the backlight unit to pass through this portion of the light control panel, thereby achieving the purposes of improving the contrast of the display image and enhancing the quality of the display image. In addition, in the case where the direct type backlight unit is directly formed on a direct type backlight source, it is difficult to divide the backlight unit to achieve a high density (the number of the backlight unit per unit area) and a high accuracy. In the case where the division density and accuracy requirements of the light control unit are high, these requirements can be achieved using the light control panel, and the manufacture process of the light control panel is easy to be implemented.

At least one embodiment of the present disclosure provides a display panel, the display panel comprises a display liquid crystal panel and a light control panel that are stacked; the display liquid crystal panel comprises a plurality of grid lines, and the plurality of grid lines comprise a plurality of first grid lines extending along a first direction and a plurality of second grid lines extending along a second direction, the first direction intersects with the second direction, and the plurality of first grid lines and the plurality of second grid lines define a plurality of sub-pixel units; the light control panel is configured to allow backlight to illuminate into the display liquid crystal panel through the light control panel, and comprises a plurality of signal lines; the plurality of signal lines comprise a plurality of first signal lines extending along the first direction and a plurality of second signal lines extending along the second direction, and the plurality of first signal lines and the plurality of second signal lines define a plurality of light control units; at least a part of the plurality of signal lines is a fold line.

Figure 1C:
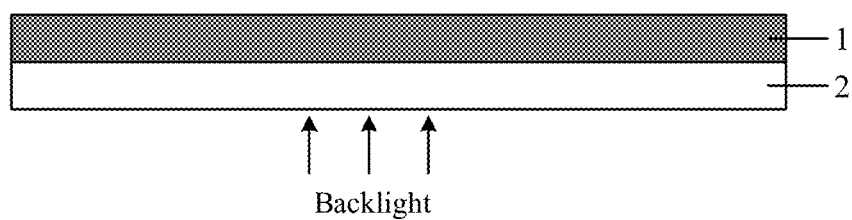
FIG. 1C is a cross-sectional diagram of a display panel provided by an embodiment of the present disclosure.
Figure 2:
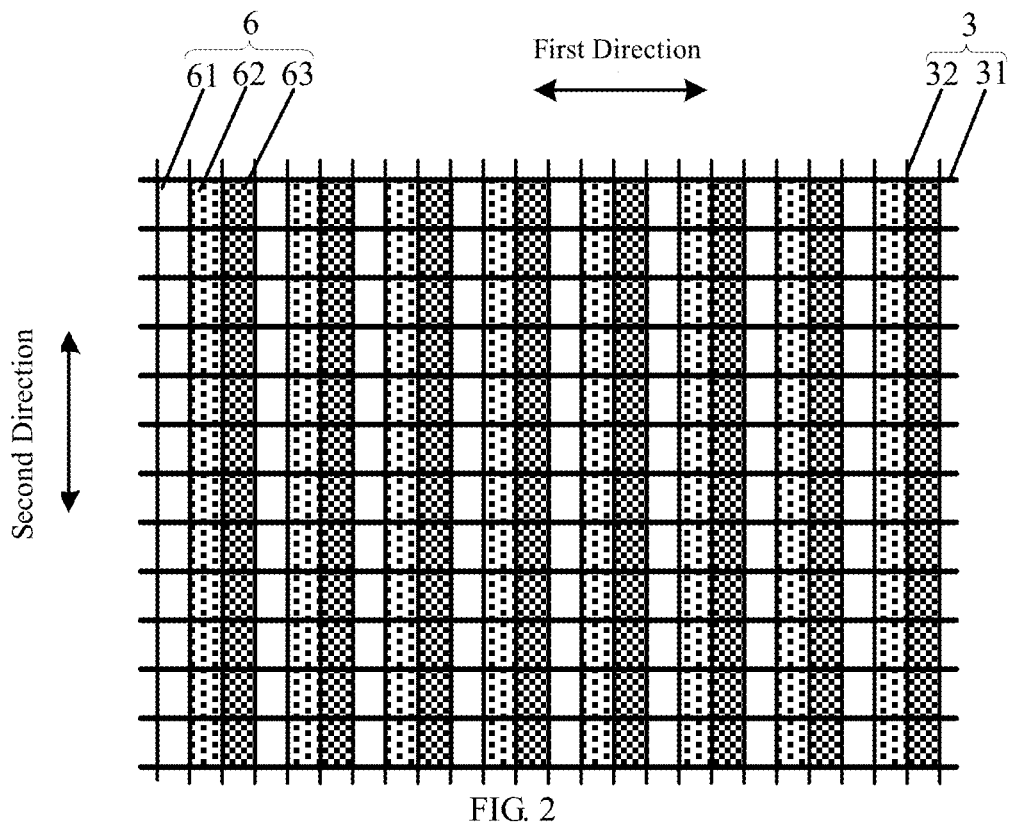
FIG. 2 is a planar diagram of a display liquid crystal panel of the display panel in FIG. 1C.

For example, FIG. 1C is a cross-sectional diagram of a display panel provided by an embodiment of the present disclosure. As illustrated in FIG. 1C, the display panel 10 comprises a display liquid crystal panel 1 and a light control panel 2 that are stacked. The light control panel 2 is configured to allow backlight to illuminate into to the display liquid crystal panel 1 through the light control panel 2. The display liquid crystal panel 1 is used to achieve a display function, and the light control panel 2 is used to control the direction or intensity of the backlight incident into the display liquid crystal panel 1 according to requirements, for example, to achieve the requirement of a conversion between a narrow viewing angle and a wide viewing angle, and achieve the requirement of controlling light emission intensities at various positions on the display panel to be different. For example, the backlight comes from a direct type backlight or a side-in type backlight. For example, FIG. 2 is a planar diagram of a display liquid crystal panel of the display panel in FIG. 1C. As illustrated in FIG. 2, the display liquid crystal panel 1 comprises a plurality of grid lines 3, and the plurality of grid lines 3 comprise a plurality of first grid lines 31 extending along a first direction and a plurality of second grid lines 32 extending along a second direction. The first direction intersects with the second direction, and the plurality of first grid lines 31 intersect with the plurality of second grid lines 32 to define a plurality of sub-pixel units. For example, the plurality of first grid lines 31 and the plurality of second grid lines 32 are all straight lines. N sub-pixel units continuously arranged in the first direction constitute one pixel unit 6, and N is a positive integer. For example, as illustrated in FIG. 1C, N=3, and the three sub-pixel units in one pixel unit 6 are respectively, for example, a first sub-pixel unit 61, a second sub-pixel unit 62, and a third sub-pixel unit 63. For example, the N sub-pixel units in the pixel unit 6 respectively emit light of different colors, so as to achieve color display. For example, the first sub-pixel units 61, the second sub-pixel units 62, and the third sub-pixel unit 63 respectively emit red light, green light, and blue light. In another embodiment, four sub-pixel units continuously arranged in the first direction may constitute one pixel unit, for example, the four sub-pixel units respectively emit red light, green light, blue light, and white light. Of course, the present disclosure is not limited to the cases listed above, and the sub-pixel units comprised in one pixel unit 6 can be designed according to requirements.

Figure 3A:
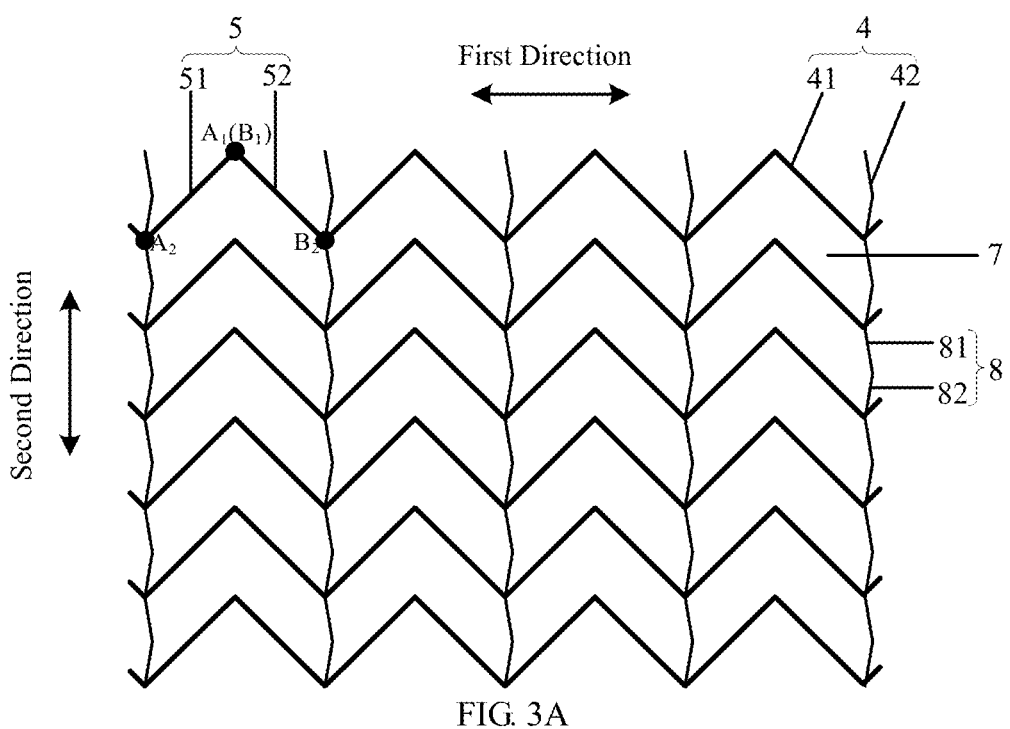
FIG. 3A is a first planar diagram of a light control panel of the display panel in FIG. 1C.
Figure 3B:
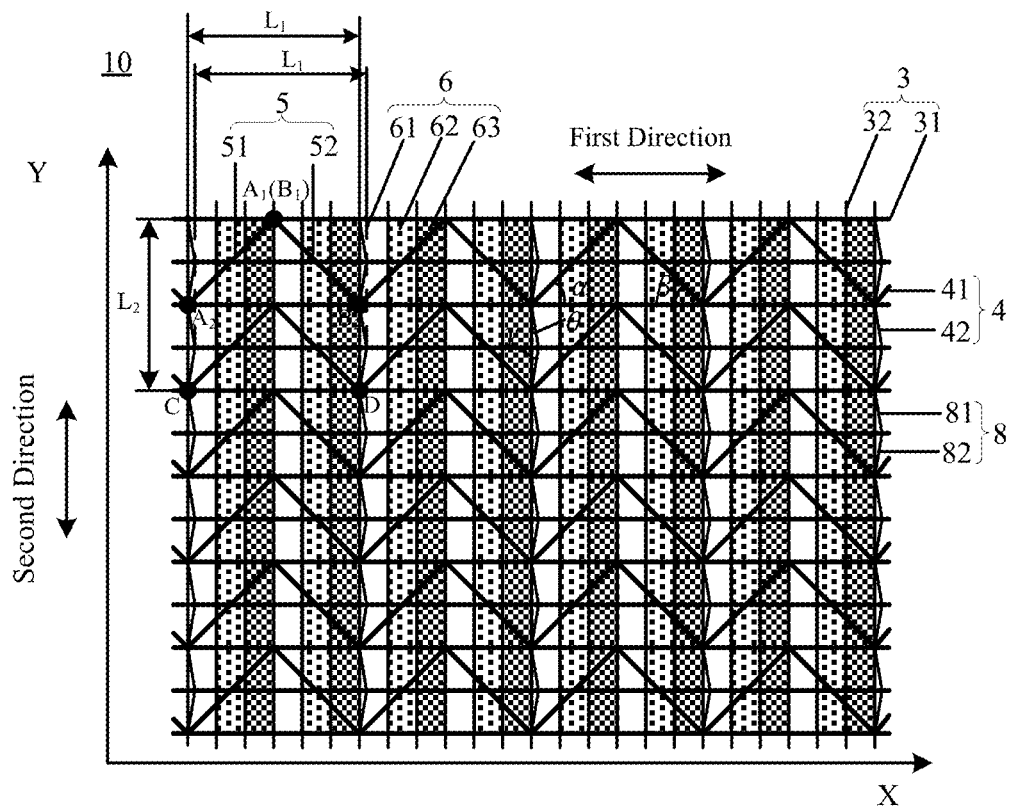
FIG. 3B is a first planar diagram of a display panel provided by an embodiment of the present disclosure.

FIG. 3A is a first planar diagram of a light control panel of the display panel in FIG. 1C; FIG. 3B is a first planar diagram of a display panel provided by an embodiment of the present disclosure, that is, a planar diagram of a display panel comprising the light control panel illustrated in FIG. 3A and the display liquid crystal panel illustrated in FIG. 2, and FIG. 3C is a enlarged diagram of a part of FIG. 3B.

Figure 3C:
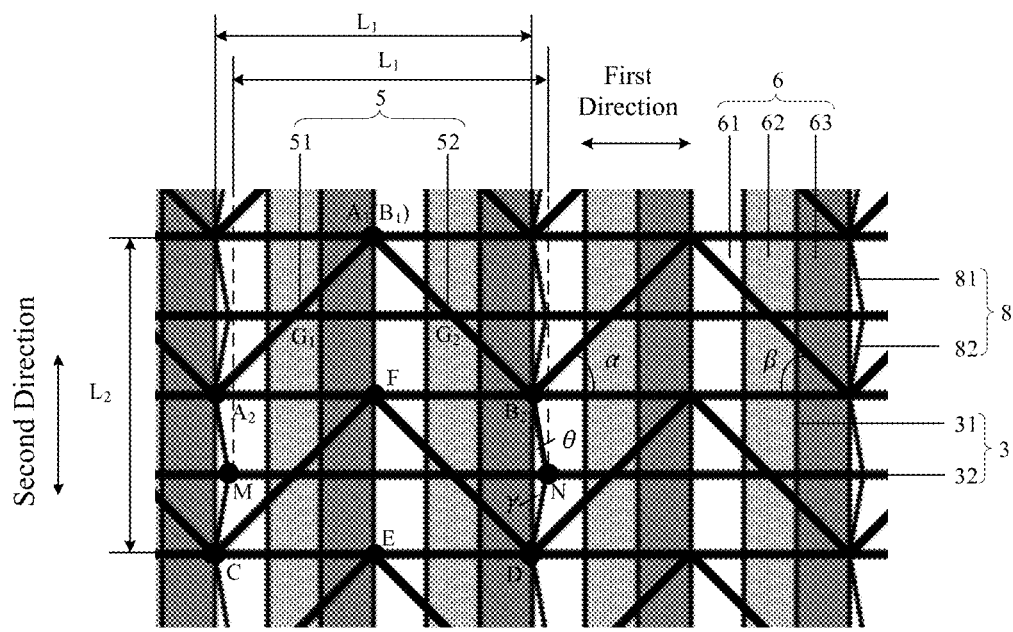
FIG. 3C is a partial enlarged diagram of FIG. 3B.

Referring to FIGS. 3A-3C, the light control panel 2 comprises a plurality of signal lines 4, the plurality of signal lines 4 comprise a plurality of first signal lines 41 extending along the first direction and a plurality of second signal lines 42 extending along the second direction. The plurality of first signal lines 41 intersect with the plurality of second signal lines 42 to define a plurality of light control units 7. For example, the plurality of grid lines 3 of the display liquid crystal panel 1 comprise straight lines extending in the first direction and straight lines extending in the second direction, and the first direction intersects with the second direction. For example, planar shapes of all the plurality of sub-pixel units defined by the grid lines 3 that intersect with each other are rectangular shapes. At least a part of the plurality of signal lines 4 is a fold line, so that the planar shape of each of the light control units 7 is different from the planar shape of each of the sub-pixel units, and the arrangement rule of the light control units 7 is different from the arrangement rule of the sub-pixel units. For example, the planar shape of each of the light control units 7 is not the rectangular shape, for example, is the irregular shape illustrated in FIG. 3A; in addition, for example, an orthographic projection of the signal lines 4 extending along the first direction or the signal line 4 extending along the second direction on the display liquid crystal panel 1 (refers to an orthographic projection on a surface of the display liquid crystal panel 1 facing the light control panel 2) intersects with the grid lines 3, and the signal lines 4 do not have the same or similar shape as the grid lines 3, so that human eyes do not observe the moire fringe, and the effect of eliminating or alleviating the moire fringe is achieved.

It should be noted that, the feature "at least a part of the plurality of signal lines 4 is a fold line" comprises the case where for at least a part of the signal lines 4, an entirety of each of the at least a part of the signal lines 4 is the fold line, and also comprises the case where a part of one of the signal lines 4 is the fold line.

The display panel 10 provided by the embodiments of the present disclosure can control the direction or intensity of the backlight incident into the display liquid crystal panel 1 without additionally adding a layer specifically for removing the moire fringe to achieve a better moire fringe eliminating effect. In addition, the application scope of the display panel 10 for adjusting light is wide, for example, light from the direct type backlight or the side-in type backlight can be adjusted in the display panel 10.

For example, as illustrated in FIG. 2 and FIG. 3A, the plurality of pixel units 6 and the plurality of light control units 7 are respectively arranged in arrays and periodically arranged, and respectively have an arrangement period in the first direction and an arrangement period in the second direction. As illustrated in FIG. 3A and FIG. 3B, for example, the first signal lines 41 are the fold lines and comprises a plurality of first fold line units 5 continuously and periodically arranged. One fold line unit 5 corresponds to one light control unit 7, that is, one fold line unit 5 passes across one light control unit 7 in the first direction. Each first fold line unit 5 comprises a first portion 51 and a second portion 52 that are sequentially arranged along the first direction, the first portion 51 comprises a first terminal $A_1$ connected to the second portion 52, and the second portion 52 comprises a first terminal $B_1$ connected to the first portion 51. That is, the first terminal $A_1$ of the first portion 51 and the first terminal $B_1$ of the second portion 52 are connected, a connection point of the first portion 51 and the second portion 52 is $A_1$ ($B_1$), that is, the points $A_1$ and $B_1$ coincide. It should be noted that the above-mentioned feature "a plurality of first fold line units 5 continuously and periodically arranged" refers that the pattern of each first fold line unit 5 is the same, and two adjacent first fold line units 5 are connected with each other and are continuously distributed, the second terminal $A_2$ of the first portion 51 of one first fold line unit 5 is connected to the second terminal $B_2$ of the second portion 52 of an adjacent first fold line unit 5. For example, two adjacent first fold line units 5 are connected by the points $A_2$ and $B_2$. The pattern of the fold line of the first signal line 41 achieves a better effect of eliminating or alleviating the moire fringe, and the structure of the period arrangement is simple and easy to be manufactured.

For example, the connection point $A_1$ ($B_1$) of the first portion 51 and the second portion 52 is an inflection point of the fold line. It should be noted that the inflection point in the present disclosure refers to the apex of the bending region of the fold line, that is, the point that changes the extending direction of the fold line, the first portion 51 and the second portion 52 are respectively on two sides of the inflection point and respectively extend toward different directions. For example, the direction of the first signal line 41 is along the first direction in FIG. 3A, and the inflection point is the point at which the extending direction of the first signal line 41 changes from going upwards into going downwards, and the upward direction and the downward direction refers to the upward direction and the downward direction illustrated in FIG. 3A, for example.

For example, as illustrated in FIG. 3B, for example, an orthographic projection of an intersection (for example, point $A_2$, point $B_2$) of the first signal line 41 and the second signal line 42 on the surface of the display liquid crystal panel 1 facing the light control panel 2 overlaps with an orthographic projection of the second grid line 32 on the surface of the display liquid crystal panel 1 facing the light control panel 2; and an orthographic projection of the connection point $A_1$ ($B_1$) of the first terminal $A_1$ of the first portion 51 and the first terminal $B_1$ of the second portion 52 of the first fold line unit 5 on the surface of the display liquid crystal panel 1 facing the light control panel 2 overlaps with an orthographic projection of one second grid line 32 on the surface of the display liquid crystal panel 1 facing the light control panel 2. For example, the intersection point of the first signal line 41 and the second signal line 42 is also the intersection point of two adjacent first fold line units 5. Exemplarily, the intersection point is, for example, the point $A_2$ and the point $B_2$. It should be noted that the first signal line 41 and the second signal line 42 intersect with each other at the point $A_2$ and the point $B_2$ instead of the first signal line 41 and the second signal line 42 being electrically connected by the point $A_2$ and the point $B_2$. In this way, the intersection point of the adjacent light control units 7 overlaps with the grid line 3 in a direction perpendicular to the display liquid crystal panel 1, that is, the orthographic projection of the intersection point of the adjacent light control units 7 on the surface of the display liquid crystal panel 1 facing the light control panel 2 overlaps with the orthographic projection of the grid line 1 on the surface of the display liquid crystal panel 1 facing the light control panel 2, so that the corresponding relationship of the orthographic projection of the signal line 4 on the display liquid crystal panel 1 and the pattern formed by the grid line 3 is relatively regular, which is beneficial to achieve a better effect of eliminating the moire fringe.

For example, as illustrated in FIG. 3B, the plurality of pixel units 6 and the plurality of light control units 7 are respectively arranged in arrays. The plurality of pixel units 6 have the same size and shape, and the plurality of light control units 7 have the same size and shape. For example, a maximum length L1 of one light control unit 7 in the first direction is m times of a length of one pixel unit 6, and a width of one light control unit 7 in the second direction is n times of a width of one pixel unit 6, m and n are both positive integers. That is, the maximum length L1 of one light control unit 7 in the first direction is equal to a sum of lengths of m pixel units 6 continuously arranged; the width L2 of one light control unit 7 in the second direction is equal to a sum of widths of n pixel pixels continuously arranged. Therefore, one light control unit 7 corresponds to m×n pixel units 6 continuously arranged (i.e., continuous m columns and n rows of pixel units 6), that is, in a direction perpendicular to a display surface of the display device, the start position and the end position of each light control unit 7 are also the start position and the end position of the group consisting of the corresponding m×n pixel units 6 continuously arranged.

Figure 4:
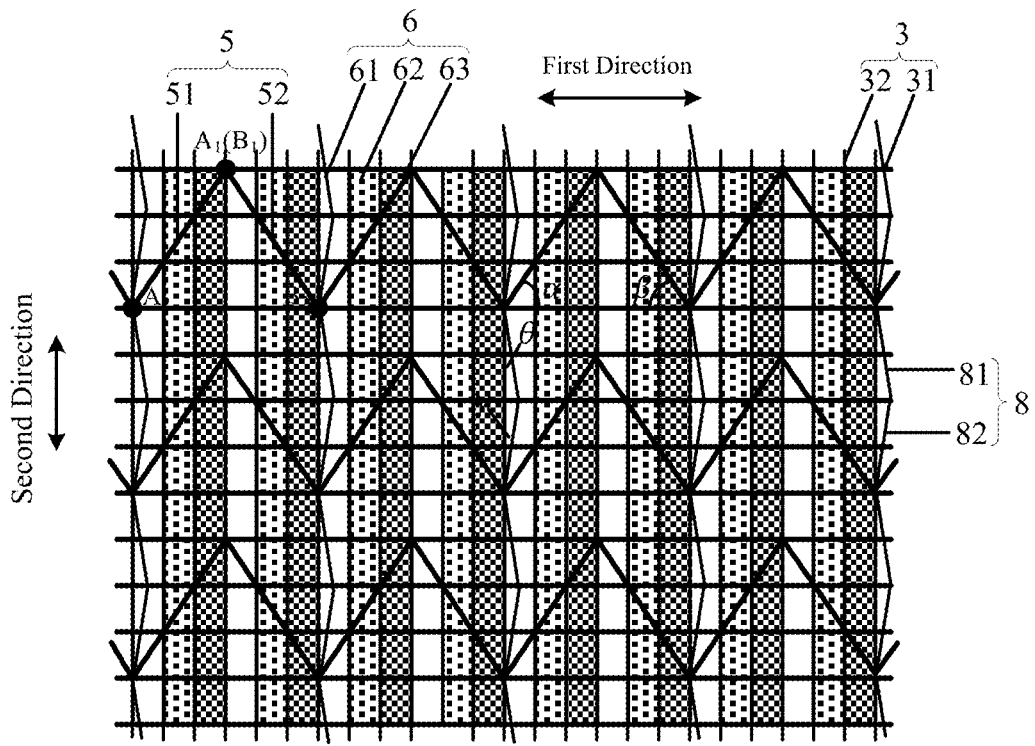
FIG. 4 is a second planar diagram of a display panel provided by an embodiment of the present disclosure.

Exemplarily, in the embodiment illustrated in FIG. 3B, m=2, n=4, and one light control unit 7 corresponds to 2×4 pixel units 6 continuously arranged. For another example, FIG. 4 is a second planar diagram of a display panel provided by an embodiment of the present disclosure, in the embodiment illustrated in FIG. 4, m=2, n=7, one light control unit corresponds to 2×7 pixel units 6 continuously arranged.

It should be noted that the width in the present disclosure refers to that on an axis (Y axis in the figure) in the second direction, a distance between a first terminal of one light control unit and a second terminal that is farthest from this first terminal in this one light control unit. For example, in FIG. 3B, the width of one light control unit 7 in the second direction refers to that on the axis in the second direction (the Y axis in the figure), the distance between the first terminal $A_1$ of the light control unit 7 and the second terminal C that is farthest from the first terminal $A_1$ in the light control unit 7.

As illustrated in FIG. 3B, an area of a planar pattern of one light control unit 7 is substantially equal to an area of a planar pattern of m×k pixel units 6, where k is the number of the pixel units 6 continuously arranged in the second direction, k≥n/2, and k is a positive integer. For example, in the embodiment illustrated in FIG. 3B, m=2 and k=2; for another example, in the embodiment illustrated in FIG. 4, m=2 and k=4. In this way, a regular and uniform grid pattern is obtained, and the interference of light at various positions of the light control panel is similar, which is beneficial to alleviating the moire fringe. As illustrated in FIG. 3C, the pattern $A_1A_2MCFDNB_2$ of one light control unit 7 with points $A_1$, $A_2$, M, C, F, D, N, and $B_2$ as vertices is divided into a first section with points $A_2$, M, C, and F as vertices, a second portion with points F, D, N, $B_2$ as vertices, and a triangle $A_1A_2B_2$. Because the area of the triangle $A_1A_2B_2$ is equal to the area of the triangle CDF, and the area of the triangle $A_2MC$ is equal to the area of the triangle $B_2ND$, the area of the pattern $A_1A_2MCFDNB_2$ is equal to the area of the rectangle $A_2CDB_2$. The rectangle $A_2CDB_2$ is composed of 2×2 pixel units 6, that is, if the widths of the grid lines and the widths of the signal lines are ignored (or the widths of the lines are divided equally between adjacent light control units), the area of one light control unit 7 is equal to the area of the planar shape of 2×2 pixel units. The arrangement rule of the embodiment illustrated in FIG. 4 is similar, and it can be calculated by analogy with the embodiment illustrated in FIG. 3B that the area of one light control unit 7 is equal to the area of a planar pattern of 2×4 pixel units 6. In this way, the light control units 7 regularly correspond to the pixel units 6, which is beneficial for the light control panel 2 to uniformly control the direction and intensity of light at various positions of the entire display panel 10, and a better effect of eliminating the moire fringe can be achieved. In addition, this solution makes it possible to allow areas of planar patterns of the first sub-pixel unit 61, the second sub-pixel unit 62, and the third sub-pixel unit 63 that overlap with each light control unit 7 in a direction perpendicular to the surface of the display liquid crystal panel 1 facing the light control panel 2 to be similar (if the widths of the grid lines and the widths of the signal lines are ignored, it can be considered that the areas of planar patterns of the first sub-pixel unit 61, the second sub-pixel unit 62, and the third sub-pixel unit 63 are substantially equal). The areas of the planar patterns of the first sub-pixel unit 61, the second sub-pixel 62, and the third sub-pixel unit 63 corresponding to each light control unit 7 are respectively substantially equal to the areas of the first sub-pixel unit 61, the second sub-pixel unit 62, and the third sub-pixel unit 63 in the m×k pixel units 6, so that the entire display panel 10 has a balanced and uniform color display effect.

For example, the number of the pixel units 6 of the display liquid crystal panel 1 illustrated in FIG. 3B is 3840×2160, and the number of the light control units 7 of the light control panel 2 is 1920×1080. The pattern formed after the pattern of the grid line 3 and the pattern of the signal line 4 illustrated in FIG. 3B are overlapped includes a plurality of periods of the pattern arranged in the second direction, for example, two adjacent pixel unit rows—N1 row and N2 row constitute a period of the pattern. Therefore, the entire display liquid crystal panel can be characterized by the $N_1$ row and $N_2$ row. In the planar diagram of the display panel 10 illustrated in FIG. 3B, an aperture ratio of the first sub-pixel unit 61, an aperture ratio of the second sub-pixel unit 62, and an aperture ratio of the third sub-pixel unit 63 in the rows extending along the first direction (in the $N_1$ row and $N_2$ row) are tested. The results are illustrated in Table 1.

TABLE 1

| Item | Aperture ratio of the first sub-pixel unit/% | Aperture ratio of the second sub-pixel unit/% | Aperture ratio of the third sub-pixel unit/% |
| --- | --- | --- | --- |
| $N_1$ row | 60.4 | 57.5 | 59.1 |
| $N_2$ row | 42.3 | 56.9 | 42.8 |
| Average value | 51.3 | 57.2 | 50.9 |

As seen from Table 1, for the $N_1$ row and $N_2$ row, the aperture ratio of the first sub-pixel unit 61, the aperture ratio of the second sub-pixel unit 62, and the aperture ratio of the third sub-pixel unit 63 are respectively 51.3%, 57.2%, and 50.9%, the differences among them are not large. Therefore, the average aperture ratios of the sub-pixel units of different colors in the $N_1$ row and $N_2$ row are similar, so that the entire display liquid crystal panel 1 has a balanced and uniform color display effect.

For example, for the case where n is equal to 2, both an orthographic projection of the first portion 51 of the first fold line unit 5 and an orthographic projection of the second portion 52 of the first fold line unit 5 on the display liquid crystal panel 1 pass through at least two pixel unit rows continuously arranged in the second direction, so as to allow the first signal line 41 to shield the at least two pixel unit rows, each pixel unit 6 has a similar aperture ratio to prevent horizontal stripes caused by a large difference in brightness between adjacent pixel unit rows, so as to achieve a better display effect. For example, in the embodiment illustrated in FIG. 3B, both the orthographic projection of the first portion 51 of the first fold line unit 5 and the orthographic projection of the second portion 52 of the first fold line unit 5 on the surface of the display liquid crystal panel 1 facing the light control panel 2 pass through two pixel unit rows continuously arranged in the second direction.

In the embodiment illustrated in FIG. 4, n is equal to 4. Both the orthographic projection of the first portion 51 of the first fold line unit 5 and the orthographic projection of the second portion 52 of the first fold line unit 5 on the surface of the display liquid crystal panel 1 facing the light control panel 2 pass through three pixel unit rows continuously arranged in the second direction. Of course, in other embodiments of the present disclosure, n may be equal to 1. Both the orthographic projection of the first portion 51 of the first fold line unit 5 and the orthographic projection of the second portion 52 of the first fold line unit 5 on the surface of the display liquid crystal panel 1 facing the light control panel 2 only passes through one pixel unit row, for example, each pixel unit row is passed through by an orthographic projection of one first signal line 41 on the display liquid crystal panel.

For example, as illustrated in FIG. 3B, the orthographic projection of each first signal line 41 on the surface of the display liquid crystal panel 1 facing the light control panel 2 as a whole passes through all the pixel units 6 of the corresponding n rows of pixel units; for example, a whole constituted by the orthographic projections of the plurality of first signal lines 41 on the surface of the display liquid crystal panel 1 facing the light control panel 2 passes through all the pixel units 6, so that the shielding ratio of the first signal lines 41 for each pixel unit is substantially the same, so as to better prevent the horizontal stripes caused by the large difference in brightness between the pixel unit rows, and achieve a better display effect.

For example, as illustrated in FIG. 3B and FIG. 3C, the orthographic projection of one first signal line 41 on the display liquid crystal panel 1 intersects with one of the plurality of first grid lines 31, and a midpoint of the first portion 51 of the first fold line unit 5 and a middle point of the second portion 52 of the first fold line unit 5 overlap with the one first grid line 31 in a direction perpendicular to the surface of the display liquid crystal panel 1 facing the light control panel 2, that is, an orthographic projection of the midpoint of the first portion 51 of the first fold line unit 5 and an orthographic projection of the midpoint of the second portion 52 of the first fold line unit 5 on the surface of the display liquid crystal panel 1 facing the light control panel 2 overlap with an orthographic projection of the first grid line 31 on the surface of the display liquid crystal panel 1 facing the light control panel 2. Therefore, the first signal line 41 appears to extend in a shape with the first grid line 31 as a center line (or baseline). For example, each of the plurality of first signal lines 41 is like this, or any one or several ones of the plurality of first signal lines 41 are like this. Taking the first grid line 31 in FIG. 3B and FIG. 3C as an example, the midpoint of the first portion 51 is the point G1, and the midpoint of the second portion 52 is the point G2. In this way, the signal lines 4 form a symmetrical and regular pattern, which is beneficial for the light control panel 2 to uniformly control the direction and intensity of light of the entire display panel 10, and is beneficial for achieving a better effect of eliminating the moire fringe.

Figure 5:
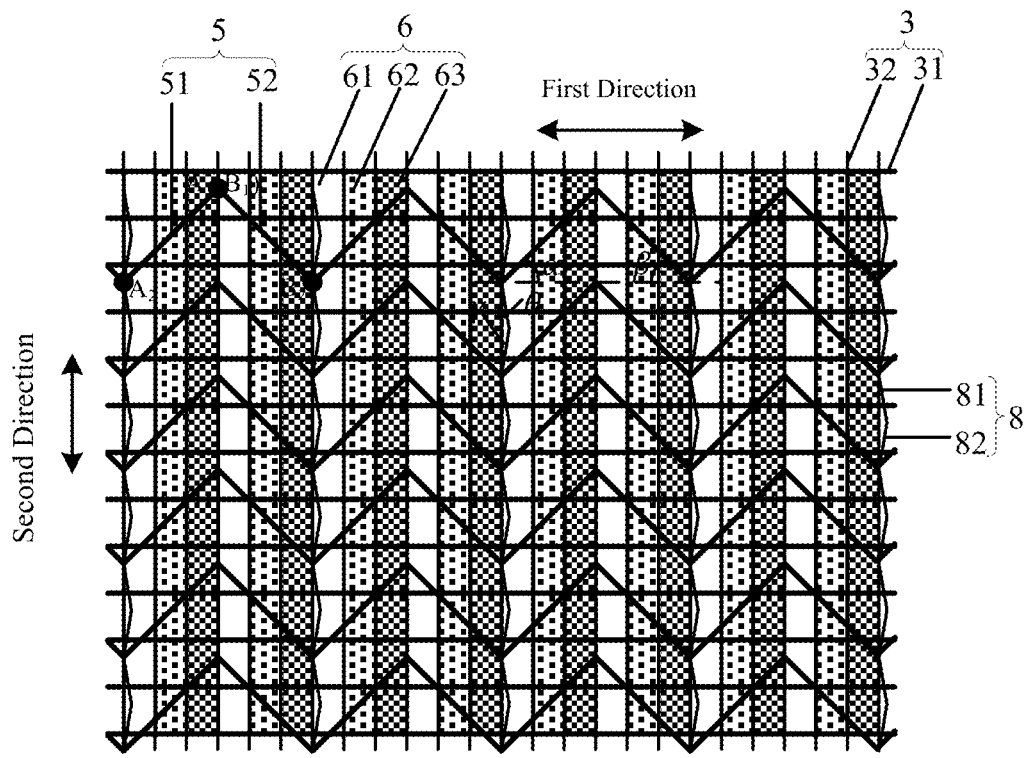
FIG. 5 is a third planar diagram of a display panel provided by an embodiment of the present disclosure.

FIG. 5 is a third planar diagram of a display panel provided by an embodiment of the present disclosure. For example, as illustrated in FIG. 5, in another embodiment of the present disclosure, any point on the first portion 51 of the first fold line unit 5 and any point on the second portion 52 of the first fold line unit 5 overlap with the first grid line 31 in the direction perpendicular to the surface of the display liquid crystal panel 1 facing the light control panel 2.

It should be noted that the grid line is described here as a line section, and the actual width of the grid line is ignored. The midpoint and the any point actually have a size corresponding to the line width.

For example, the first portion 51 and the second portion 52 of the first signal line 41 are symmetrical with respect to a symmetry axis along the second direction. For example, the symmetry axis overlaps with one second grid line 32 in a direction perpendicular to the surface of the display liquid crystal panel 1 facing the light control panel 2, that is, an orthographic projection of the symmetry axis on the surface of the display liquid crystal panel 1 facing the light control panel 2 overlaps with an orthographic projection of one second grid line 32 on the surface of the display liquid crystal panel 1 facing the light control panel 2. Compared with the case where the first portion 51 of the first fold line unit 5 and the second portion 51 of the first fold line unit 5 are asymmetric, this solution can allow the signal lines 4 of the light control panel 2 to shield the pixel units 6 more uniformly, and each display unit has substantially the same aperture ratio, so that the brightness of the plurality of pixel units 6 is uniform, which is not only beneficial to achieving a better effect of eliminating the moire fringe, but also achieves a better display effect while alleviating or eliminating the moire fringe.

For example, the first portion 51 of the first fold line unit 5 has a first angle α with the first direction (ie, the X axis), and the second portion 52 of the first fold line unit 5 has a second angle β with the first direction. Both the angle α and the second angle β range from 37° to 70°. For example, the first angle α is equal to or not equal to the second angle β.

Optical simulation is performed on the display panel illustrated in FIG. 3B. The first angle α and the second angle β are changed, and values of cycle per degree (CPD) are measured under different values of α and β. In general, when the value of CPD is larger than 35, the moire fringe is not easy to be observed by human eyes. Table 2 shows the results of the moire fringe simulation test. As seen from Table 2, in the case where the values of α and β range from 37° to 70°, the values of CPD are more than 35, in this situation, human eyes are less likely to observe the moire fringe, and the moire fringe is difficult to be detected. Compared with the case that the values of α and β range from 37° to 50°, in the case where the values of α and β range from 50° to 70°, the first signal line 41 provide a more uniform shielding to at least two pixel unit rows. Therefore, each pixel unit 6 has a similar aperture ratio, which better avoids horizontal stripes.

TABLE 2

| Angle/° | 37 | 45 | 46 | 46.5 | 47 | 48 | 50 | 55 |
|---|---|---|---|---|---|---|---|---|
| CPD | 52.3563 | 52.3563 | 52.3563 | 52.3563 | 52.3563 | 52.3563 | 52.3563 | 52.3563 |
| Angle/° | 56 | 57 | 58 | 59 | 60 | 63.5 | 68 | 70 |
| CPD | 52.3563 | 52.3563 | 52.3563 | 52.3563 | 52.3563 | 52.3563 | 52.3563 | 52.3563 |

Figure 6A:
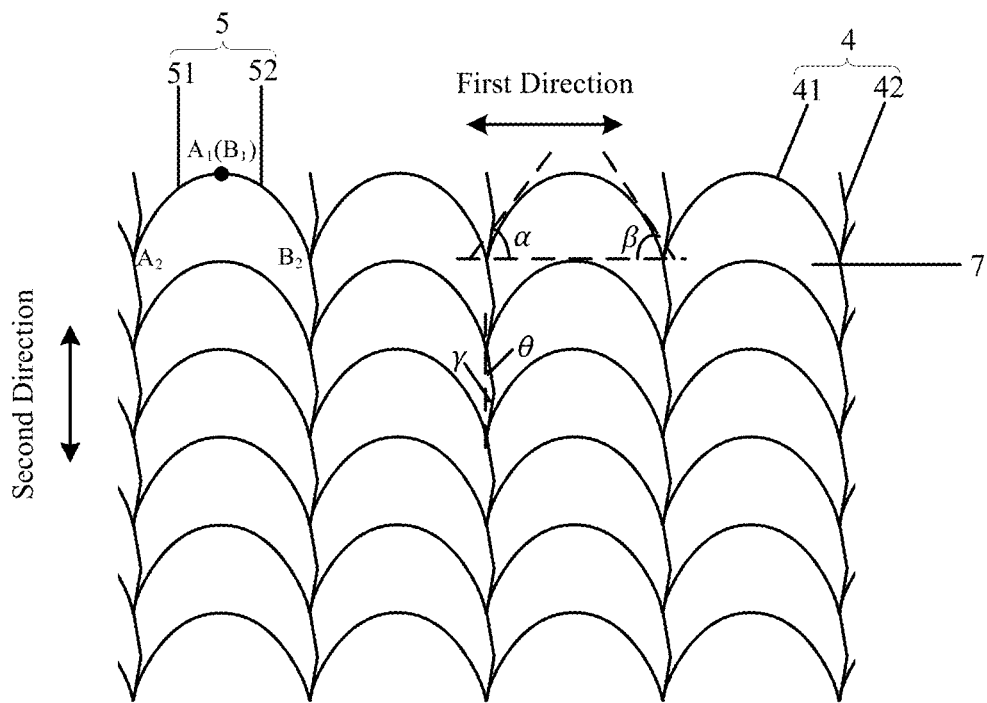
FIG. 6A is a second planar diagram of a light control panel of the display panel in FIG. 1C.
Figure 6B:
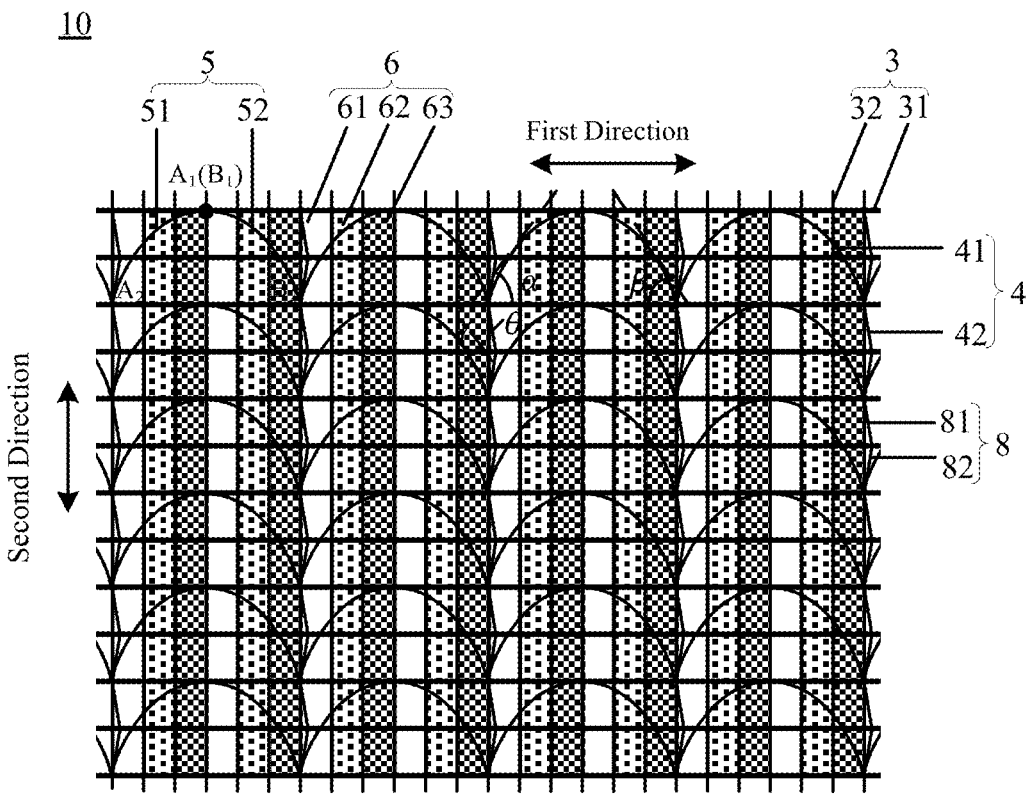
FIG. 6B is a fourth planar diagram of a display panel provided by an embodiment of the present disclosure.

FIG. 6A is a second planar diagram of the light control panel of the display panel in FIG. 1C; FIG. 6B is a fourth planar diagram of a display panel provided by an embodiment of the present disclosure, that is, a planar diagram of the light control panel illustrated in FIG. 6A and the display liquid crystal panel illustrated in FIG. 1C that are stacked. For example, the first portion 51 of the first fold line unit 5 and the second portion 52 of the first fold line unit 5 are straight segments, as illustrated in FIG. 3B, FIG. 4 and FIG. 5, for example, a bending portion of the first fold line unit 5 comprises a corner; or, the first portion 51 and the second portion 52 of the first fold line unit 5 are curved segments, as illustrated in FIG. 6A and FIG. 6B. For example, the bending portion of the first fold line unit does not comprise a corner but is a curved line (e.g., in an arc shape) without comprising a corner.

For example, as illustrated in FIG. 3B and FIG. 3C, each of the second signal lines 42 is the fold line and comprises a plurality of second fold line units 8 periodically arranged. For example, one second fold line unit 8 corresponds to one light control unit 7. One second fold line unit 8 comprises a first portion 81 and a second portion 82 that are sequentially arranged along the second direction. The first portion 81 comprises a first terminal connected to the second portion 82, and the second portion 82 comprises a first terminal connected to the first portion. That is, the first terminal of the first portion 81 of the second fold line unit 8 and the first terminal of the second portion 82 of the second fold line unit are connected, and the connection point is the point M. In this way, each of the second signal lines 42 and each of the first signal lines 41 are both fold lines, so as to further improve the effect of eliminating the moire fringe.

Figure 7A:
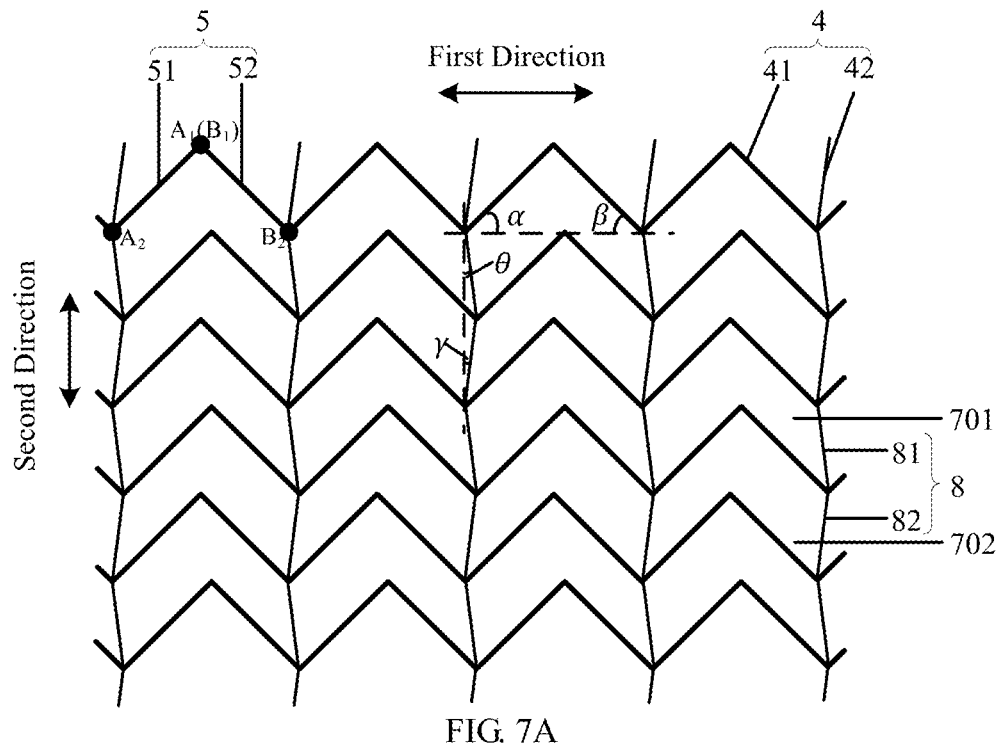
FIG. 7A is a third planar diagram of a light control panel of the display panel in FIG. 1C.
Figure 7B:
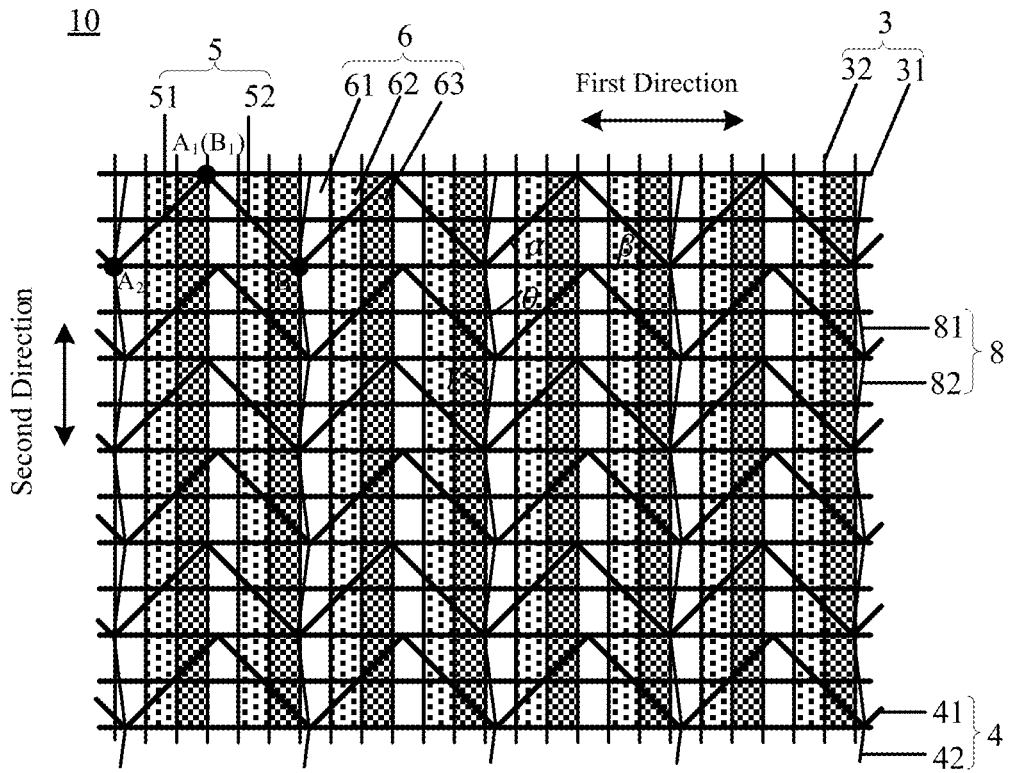
FIG. 7B is a fifth planar diagram of a display panel provided by an embodiment of the present disclosure.

FIG. 7A is a third planar diagram of a light control panel of the display panel in FIG. 1C, and FIG. 7B is a fifth planar diagram of a display panel provided by an embodiment of the present disclosure, that is, a planar diagram of the light control panel illustrated in FIG. 7A and the display liquid crystal panel illustrated in FIG. 1C that are stacked. For example, in another embodiment, as illustrated in FIG. 7B, one second fold line unit 8 correspond to two light control units 7. In this case, not all the orthographic projections of the connection points $A_1$ of the first terminal of the first portion 51 of the first fold line unit 5 and the first terminal of the second portion 52 of the first fold line unit 5 on the surface of the display liquid crystal panel 1 facing the light control panel 2 overlap with the orthographic projection of the second grid line 32 on the surface of the display liquid crystal panel 1 facing the light control panel 2.

For example, the first portion 81 of the second fold line unit 8 and the second portion 82 of the second fold line unit 8 are symmetrical with respect to a symmetry axis along the first direction. For example, the symmetry axis overlaps with one first grid line 31 in the direction perpendicular to the surface of the display liquid crystal panel 1 facing the light control panel 2, that is, an orthographic projection of the symmetry axis on the surface of the display liquid crystal panel 1 facing the light control panel 2 overlaps with an orthographic projection of one first grid line 31 on the surface of the display liquid crystal panel 1 facing the light control panel 2. Compared with the case that the first portion 51 of the second fold line unit 8 and the second portion 51 of the second fold line unit 8 are asymmetrical, this solution allows the signal lines 4 of the light control panel 1 to shield each pixel unit 6 more regularly and more uniformly, so that the aperture ratio of each pixel unit 6 is substantially the same, and the display brightness and the color effect of the plurality of pixel units 6 are consistent, which is not only beneficial to achieving a better effect of eliminating the moire fringe, but also achieves a better display effect while alleviating or eliminating the moire fringe.

For example, as illustrated in FIG. 3B and FIG. 3C, the first portion 81 of the second fold line unit 8 has a third angle θ with the second direction, and the second portion 82 of the second fold line unit 8 has a fourth angle γ with the second direction, both the third angle θ and the fourth angle γ are less than 7°. If the third angle θ and the fourth angle γ are too large, the degree of irregularity of the pattern of the signal line 4 is significantly increased, and the large degree of irregularity of the pattern of the signal line 4 is not beneficial to the elimination of the moire fringe, and the feature that both the third angle θ and the fourth angle γ are less than 7° can prevent this problem. For example, the third angle θ is equal to or not equal to the fourth angle γ.

For example, as illustrated in FIG. 3B and FIG. 3C, an orthographic projection of one second signal line 42 on the surface of the display liquid crystal panel 1 facing the light control panel 2 intersect with an orthographic projection one of the plurality of second grid lines 32 on the surface of the display liquid crystal panel 1 facing the light control panel 2, and the second terminal $A_2$ of the first portion 81 of the second fold line unit 8 and the second terminal C of the second portion 82 of the second fold line unit 8 overlap with the second grid lines 32 in the direction perpendicular to the surface of the display liquid crystal panel 1 facing the light control panel 2, that is, orthographic projections of the second terminal $A_2$ of the first portion 81 of the second fold line unit 8 and the second terminal C of the second portion 82 of the second fold line unit 8 on the surface of the display liquid crystal panel 1 facing the light control panel 2 overlap with the orthographic projection of the second grid line 32 on the surface of the display liquid crystal panel 1 facing the light control panel 2. For example, the first portion 81 and the second portion 82 are located on the same side or different sides of the second grid line 32 overlapping with the first portion 81 and the second portion 82. For example, the intersection point of the first signal line 41 and the second signal line 42 is also the intersection point of two adjacent first fold line units and the intersection point of two adjacent second fold line units 8. Exemplarily, the intersection points of the first signal lines 41 and the second signal lines 42 comprise the point $A_2$, the point $B_2$, the point C, and the point D.

For example, a connection point of the first portion 51 and the second portion 52 of one first fold line unit 5 may overlap with (as illustrated in FIG. 3B) or not overlap with (as illustrated in FIG. 5) an intersection point of the first grid line 31 and the second grid line 32 in the direction perpendicular to the surface of the display liquid crystal panel 1 facing the light control panel 2.

For the embodiments illustrated in FIG. 4, FIG. 5, FIG. 6B, and FIG. 7B, the features and technical effects that are not mentioned are the same as those of the embodiment illustrated in FIG. 3B, please refer to the previous descriptions.

Figure 8A:
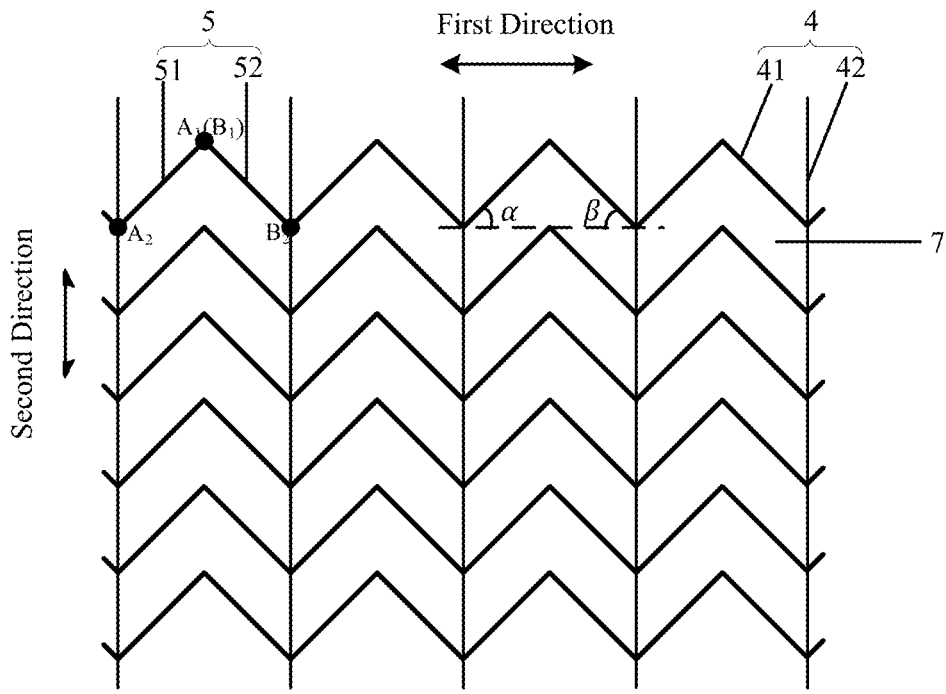
FIG. 8A is a fourth planar diagram of a light control panel of the display panel in FIG. 1C.
Figure 8B:
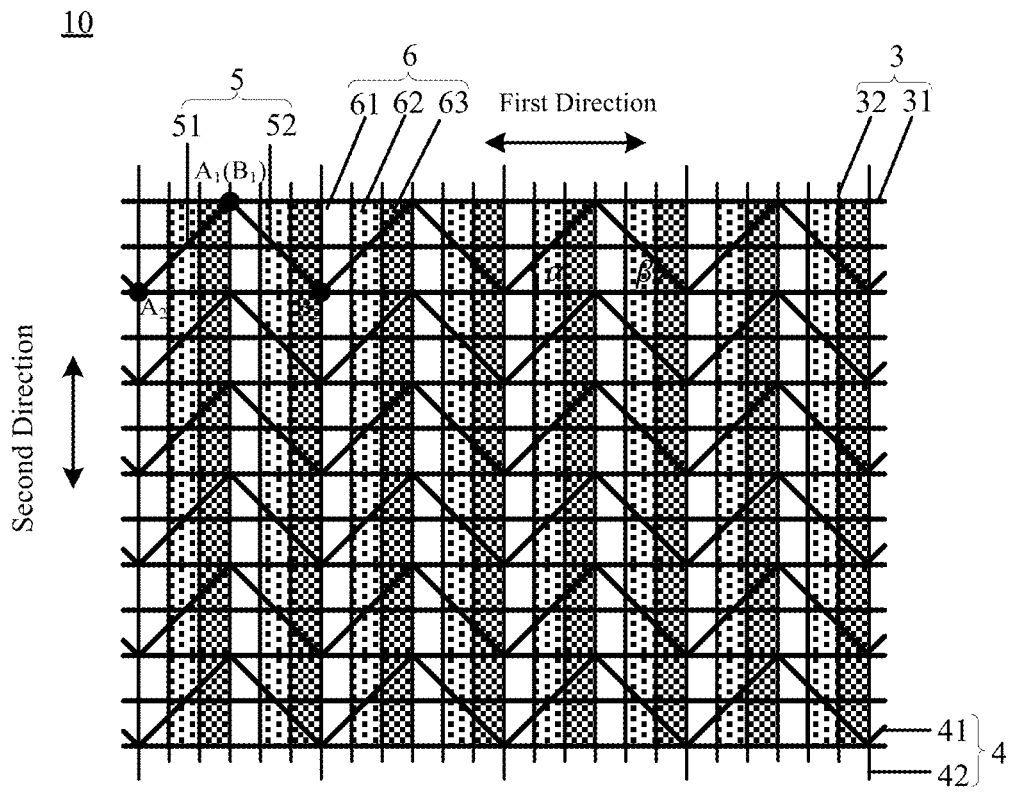
FIG. 8B is a sixth planar diagram of a display panel provided by an embodiment of the present disclosure.

For example, in another embodiment of the present disclosure, the second signal line 42 is a straight line. FIG. 8A is a fourth planar diagram of a light control panel of the display panel in FIG. 1C, and FIG. 8B is a sixth planar diagram of a display panel provided by an embodiment of the present disclosure, and the display panel comprises the light control panel in FIG. 8B and the display liquid crystal panel in FIG. 2. As illustrated in FIG. 8A and FIG. 8B, for example, the second signal line 42 is a straight line to simplify the pattern of the signal line 4 and facilitate the production. In this case, for example, the orthographic projection of each of the second signal line 42 on the surface of the display liquid crystal panel 1 facing the light control panel 2 overlaps with the orthographic projection of a corresponding one of the second grid lines 32 on the surface of the display liquid crystal panel 1 facing the light control panel 2, which is beneficial to eliminating the moire fringe. In this case, in the direction perpendicular to the display surface of the display device, the starting position and the ending position of each light control unit 7 is also the starting position and the ending position of a group consisting of the corresponding m×n pixel units 6 continuously arranged.

For example, a width of each of the first signal lines 41 in the second direction is larger than a width of each of the second signal lines 42 in the first direction. The width is a line width of the first signal line 41 and the second signal line 42. The signal line with a larger line width has a more obvious effect on the moire fringe. Therefore, the first signal line 41 with a larger width is the fold line and has a greater degree of inclination, which is more conducive to eliminating or alleviating the moire fringe.

Other features of the display panel illustrated in FIG. 8B are the same as those in the embodiment illustrated in FIG. 3B. Please refer to the previous descriptions.

For example, each of the first signal line 41 is a first gate line, and each of the second signal line 42 is a first data line. The first signal lines 41 are insulated from the second signal lines 42, for example, an insulation layer is provided between the first signal line 41 and the second signal line to insulate the first signal line 41 and the second signal line. The first gate line and the first data line are respectively configured to provide a second gate signal and a second data signal that are used for driving liquid crystal molecules (not illustrated) in the light control unit 7 of the light control panel 2 to rotate, so that the light control panel 2 can adjust the exit angle or intensity of the backlight. For another example, in another embodiment of the present disclosure, each of the first signal line 41 is a first data line, and each of the second signal line 42 is a first gate line. More specifically, each light control unit 7 comprises a thin film transistor (as a switching component), a pixel electrode, and a common electrode; a gate electrode of the thin film transistor is connected to a first gate line to receive a gate signal, and a first electrode (for example, a source electrode) of the thin film transistor is connected to the first data line to receive a data signal, and a second electrode (for example, a drain electrode) of the thin film transistor is connected to the pixel electrode to charge the pixel electrode when the thin film transistor is in an turn-on state; the common electrode, the pixel electrode, and the liquid crystal layer form a liquid crystal capacitor together, after the pixel electrode is charged, an electric field is formed between the common electrode and the pixel electrode, so as to control the rotation of liquid crystal molecules in the liquid crystal layer. According to the light control panel being a vertical electric field type or a horizontal electric field type, the common electrode and the pixel electrode are on the same substrate and disposed adjacent to each other, or the common electrode and the pixel electrode are on different substrates and opposite to each other.

In one embodiment, the grid lines 3 comprise a second gate line and a second data line. For example, each of the first grid lines 31 is the second gate line, each of the second grid lines 32 is the second data line, and the first grid lines 31 are insulated from the second grid lines 32. The second gate line and the second data line are respectively configured to provide a second gate signal and a second data signal that are used for driving liquid crystal molecules (not illustrated) in the sub-pixel units of the display liquid crystal panel 1 to rotate. Alternatively, in another embodiment, the grid lines 3 further comprise a black matrix for preventing crosstalk between color light from adjacent sub-pixel units. The black matrix comprises a first black matrix stripe extending along the first direction and a second black matrix stripe extending along the second direction. In a direction perpendicular to the display surface of the display panel, the first black matrix stripe covers the first signal line (such as a gate line) extending along the first direction, for example, the first black matrix stripe has the same outline as the first signal line; the second black matrix stripe covers a second signal line (such as a data line) extending along the second direction, that is, an orthographic projection of the first signal line on the surface of the display liquid crystal panel 1 facing the light control panel 2 is within an orthographic projection of the first black matrix stripe on the surface of the display liquid crystal panel 1 facing the light control panel 2. For example, the second black matrix stripe has the same outline as the second signal line, that is, an orthographic projection of the second signal line on the surface of the display liquid crystal panel 1 facing the light control panel 2 coincide with an orthographic projection of the second black matrix stripe on the surface of the display liquid crystal panel 1 facing the light control panel 2. More specifically, each pixel unit 7 comprises a thin film transistor (as a switching component), a pixel electrode, and a common electrode; a gate electrode of the thin film transistor is connected to the second gate line to receive a gate signal, and a first electrode (such as a source electrode) of the thin film transistor is connected to the second data line to receive a data signal, and the second electrode (such as a drain electrode) of the thin film transistor is connected to the pixel electrode to charge the pixel electrode where the thin film transistor is in a turn-on state. The common electrode, the pixel electrode and the liquid crystal layer form a liquid crystal capacitor together. After the pixel electrode is charged, an electric field is formed between the common electrode and the pixel electrode to control the rotation of liquid crystal molecules in the liquid crystal layer. According to the display liquid crystal panel being a vertical electric field type or a horizontal electric field type, the common electrode and the pixel electrode are on the same substrate and disposed adjacent to each other, or the common electrode and the pixel electrode are on different substrates and opposite to each other. The display liquid crystal panel further comprises a color filter for color display.

It should be noted that the drawings of the embodiments of the present disclosure only show structures directly related to the core idea of the present disclosure, for other structures of the display liquid crystal panel 1, such as a display driving circuit, a color film, an interlayer insulation layer and so on, and for other structures of the light control panel 2, such as a light control driving circuit and so on, those skilled in the art may refer to the conventional technology.

Figure 9A:
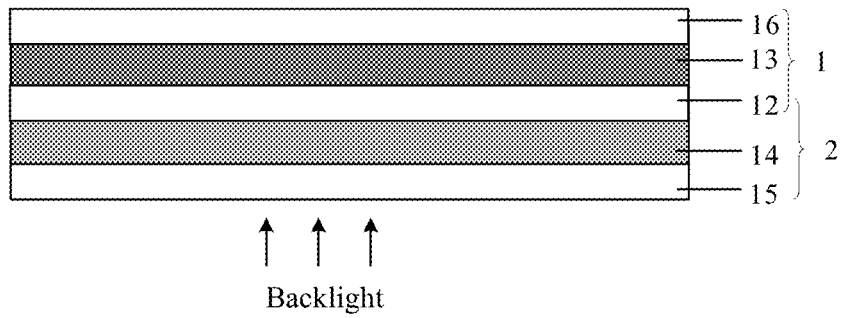
FIG. 9A is a cross-sectional diagram of another display panel provided by an embodiment of the present disclosure.

FIG. 9A is a cross-sectional diagram of another display panel provided by an embodiment of the present disclosure. For example, as illustrated in FIG. 9A, the display panel comprises a first base substrate 12, a second base substrate 15, and a third base substrate 16. The display liquid crystal panel 1 comprises the first base substrate 12, the third base substrate 16 opposite to the first base substrate 12, and a display function layer 13 between the first base substrate 12 and the third base substrate 16. The light control panel 2 comprises the first base substrate 12, the second base substrate 15 opposite to the first base substrate 12, and a light control function layer 14 between the first base substrate 12 and the second base substrate 15. For example, the first base substrates 12, the second base substrates 15, and third base substrate 16 are all glass substrates, quartz substrates, or the like. The display liquid crystal panel 1 and the light control panel 2 share the first base substrate 12, that is, both the display liquid crystal panel 1 and the light control panel 2 comprise the same first base substrate 12. For example, the display liquid crystal panel 1 comprises the display function layer 13, and the light control panel 2 comprises the light control function layer 14; the display function layer 13 is provided on a first side of the first base substrate 12, and the light control function layer 14 is provided on a second side of the base substrate 12, the second side is opposite to the first side, which simplifies the structure of the display panel 10 and reduces the thickness of the display panel 10. The display function layer 13 of the display liquid crystal panel comprises various components for display, such as a grid line, a display driving circuit, a liquid crystal layer, a color filter, and so on. The light control function layer 14 of the light control panel comprises, for example, various components for achieving light control, such as a signal line, a light control driving circuit, a liquid crystal layer, and so on.

For example, in one embodiment, the display driving circuit is on a side of the display function layer 13 that is close to the first base substrate 12, and the light control driving circuit is on a side of the light control function layer 14 that is close to the first base substrate 12. That is, both the display driving circuit and the light control driving circuit are provided on the first base substrate 12.

For example, in another embodiment, the display driving circuit is disposed on a side of the display function layer 13 that is close to the first base substrate 12, and the light control driving circuit is disposed on a side of the light control functional layer 14 that is close to the second base substrate 15. That is, the display driving circuit is provided on the first base substrate 12, and the light control driving circuit is provided on the second base substrate 15.

Figure 9B:
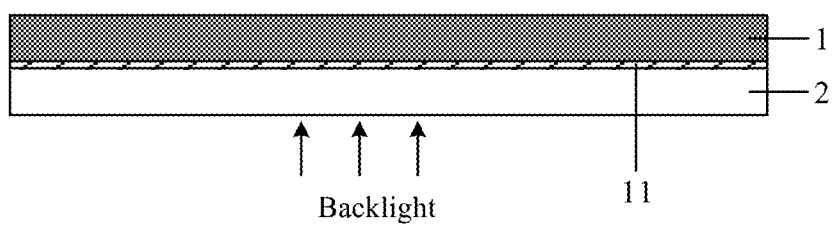
FIG. 9B is a cross-sectional diagram of further another display panel provided by an embodiment of the present disclosure.

FIG. 9B is a cross-sectional diagram of another display panel provided by an embodiment of the present disclosure. As illustrated in FIG. 9B, the display panel 10 further comprises the display liquid crystal panel 1 and the light control panel 2 in FIG. 1C. For example, the display panel 10 further comprises an isotropic diffusion film (IDF) 11 between the display liquid crystal panel 1 and the light control panel 2. Thus, the backlight of the backlight source enters the light control panel 2, and the light emitted from the light control panel 2 passes through the IDF 11 and is diffused isotropically first, and then illuminates into the display liquid crystal panel 1. For example, the IDF 11 is attached to the display liquid crystal panel 1 and the light control panel 2 by an adhesive layer, and the IDF 11 has the same outline as at least the display liquid crystal panel 1. The IDF 11 diffuses the light emitted from the light control panel 2 in a small angle range, thereby blurring the pattern of the signal line 4, further eliminating the moire fringe, and not greatly affecting the direction of light emitted from the light control panel 2.

At least one embodiment of the present disclosure provides a display device, and the display device comprises any one of the display panels provided by the embodiments of the present disclosure.

Figure 10:
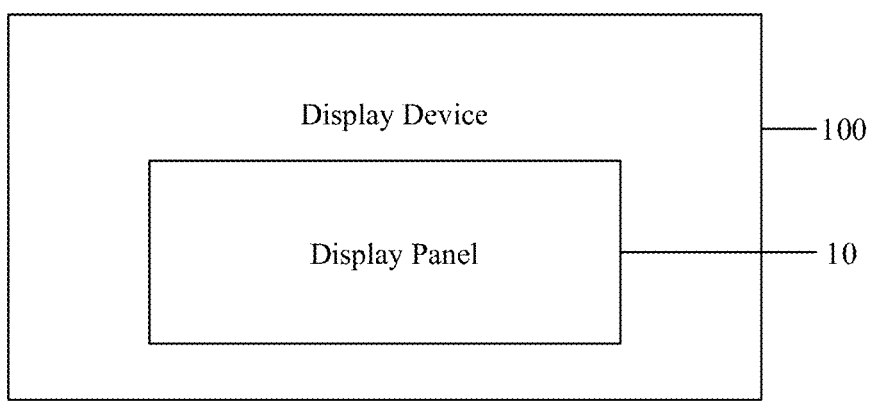
FIG. 10 is a schematic diagram of a display device provided by an embodiment of the present disclosure.

For example, FIG. 10 is a schematic diagram of a display device provided by an embodiment of the present disclosure. As illustrated in FIG. 10, the display device 100 comprises any display panel 10 provided by the embodiments of the present disclosure. The display device 100 is a liquid crystal display device. For example, the display device can be implemented as the following products: any product or component having a display function, such as a mobile phone, a tablet computer, a display, a notebook computer, an ATM machine, and the like. The display device 10 can control the direction or intensity of the backlight incident into the display liquid crystal panel 1, and can achieve the effect of eliminating or alleviating the moire fringe.

Figure 11:
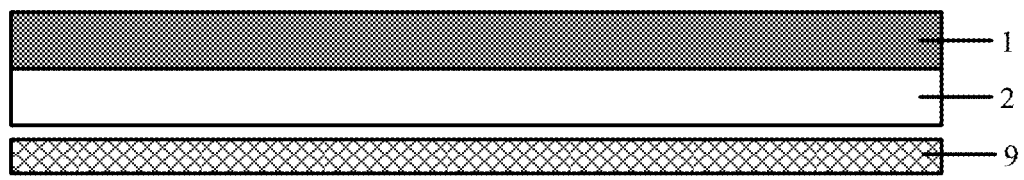
FIG. 11 is a cross-sectional diagram of a display device provided by an embodiment of the present disclosure.

For example, FIG. 11 is a cross-sectional diagram of a display device provided by an embodiment of the present disclosure. The display device further comprises a backlight unit (backlight source) 9. The backlight unit 9 may be a direct type backlight unit or a side-in type backlight unit, which is not limited in the embodiments of the present disclosure. The backlight unit 9 is on a side of the display panel that is close to the light control panel 2, that is, the light control panel 2 is between the backlight unit 9 and the display liquid crystal panel 1, so that the backlight from the backlight unit 9 enters the light control panel 2 first, in which the exit angle or intensity of the backlight are adjusted by the light control panel 2, and then the backlight illuminates into the display liquid crystal panel 1, for example, the requirement for achieving the conversion between a narrow viewing angle and a wide viewing angle, and the requirement for controlling different light emitting intensities at various positions of the display panel are achieved.

The above descriptions are only specific embodiments of the present disclosure, but the protection scope of the present disclosure is not limited thereto, the protection scope of the present disclosure should be determined by the protection scope of the claims.

What is claimed is:

1. A display panel, comprising a display liquid crystal panel and a light control panel that are stacked,
    wherein the display liquid crystal panel comprises a plurality of grid lines, and the plurality of grid lines comprise a plurality of first grid lines extending along a first direction and a plurality of second grid lines extending along a second direction, the first direction intersects with the second direction, and the plurality of first grid lines and the plurality of second grid lines define a plurality of sub-pixel units;
    the light control panel is configured to allow backlight to illuminate into the display liquid crystal panel through the light control panel, and comprises a plurality of signal lines; the plurality of signal lines comprise a plurality of first signal lines extending along the first direction and a plurality of second signal lines extending along the second direction, and the plurality of first signal lines and the plurality of second signal lines define a plurality of light control units;
    each of the first signal lines is the fold line and comprises a plurality of first fold line units continuously arranged, the first fold line units are in one-to-one correspondence to the light control units, and each of the first fold line units comprises a first portion and a second portion sequentially arranged along the first direction, the first portion comprises a first terminal connected to the second portion, and the second portion comprises a first terminal connected to the first portion.

2. A display panel, comprising a display liquid crystal panel and a light control panel that are stacked,
    wherein the display liquid crystal panel comprises a plurality of grid lines, and the plurality of grid lines comprise a plurality of first grid lines extending along a first direction and a plurality of second grid lines extending along a second direction, the first direction intersects with the second direction, and the plurality of first grid lines and the plurality of second grid lines define a plurality of sub-pixel units;
    the light control panel is configured to allow backlight to illuminate into the display liquid crystal panel through the light control panel, and comprises a plurality of signal lines; the plurality of signal lines comprise a plurality of first signal lines extending along the first direction and a plurality of second signal lines extending along the second direction, and the plurality of first signal lines and the plurality of second signal lines define a plurality of light control units;
    each of the first signal lines is the fold line and comprises a plurality of first fold line units continuously and periodically arranged, the first fold line units are in one-to-one correspondence to the light control units, and each of the first fold line units comprises a first portion and a second portion sequentially arranged along the first direction, the first portion comprises a first terminal connected to the second portion, and the second portion comprises a first terminal connected to the first portion.

3. The display panel according to claim 2, wherein
    an orthographic projection of an intersection point of the first signal line and the second signal line on a surface of the display liquid crystal panel facing the light control panel overlaps with an orthographic projection of the second grid line on the surface of the display liquid crystal panel facing the light control panel;
    an orthographic projection of a connection point of the first terminal of the first portion and the first terminal of the second portion of each of the first fold line units on the surface of the display liquid crystal panel facing the light control panel overlaps with an orthographic projection of one of the second grid lines on the surface of the display liquid crystal panel facing the light control panel.

4. The display panel according to claim 3, wherein N sub-pixel units of the plurality of sub-pixel units continuously arranged along the first direction constitute a pixel unit, and N is a positive integer;
a plurality of pixel units and the plurality of light control units are respectively arranged in arrays;
in the first direction, a maximum length of one light control unit of the plurality of light control units is m times of a length of one pixel unit of the plurality of pixel units; in the second direction, a width of one light control unit of the plurality of light control units is n times of a width of one pixel unit of the plurality of pixel units; and both m and n are positive integers.

5. The display panel according to claim 4, wherein an area of a planar pattern of one of the light control units is substantially equal to an area of a planar pattern of m×k pixel units of the plurality of pixel units, and k is a count of the pixel units that are continuously arranged in the second direction; k is a positive integer, and k≥n/2.

6. The display panel according to claim 2, wherein N sub-pixel units of the plurality of sub-pixel units continuously arranged along the first direction constitute a pixel unit, and N is a positive integer; both an orthographic projection of the first portion and an orthographic projection of the second portion on a surface of the display liquid crystal panel facing the light control panel pass through at least two pixel unit rows continuously arranged in the second direction.

7. The display panel according to claim 6, wherein a whole orthographic projection constituted by orthographic projections of the plurality of first signal lines on the surface of the display liquid crystal panel facing the light control panel passes through all the pixel units.

8. The display panel according to claim 6, wherein an orthographic projection of one of the first signal lines on the surface of the display liquid crystal panel facing the light control panel intersects with an orthographic projection of one of the plurality of first grid lines on the surface of the display liquid crystal panel facing the light control panel, and a midpoint of the first portion of the first fold line unit and a midpoint of the second portion of the first fold line unit overlap with the one of the plurality of first grid lines in a direction perpendicular to the surface of the display liquid crystal panel facing the light control panel.

9. The display panel according to claim 2, wherein
the first portion and the second portion of at least one of the plurality of first fold line units are symmetrical with respect to a symmetry axis along the second direction.

10. The display panel according to claim 9, wherein the first portion has a first angle with respect to the first direction, and the second portion has a second angle with respect to the first direction,
both the first angle and the second angle range from 37° to 70°.

11. The display panel according to claim 2, wherein the first portion is a straight section or a curved section, and the second portion is a straight section or a curved section.

12. The display panel according to claim 2, wherein
each of the second signal lines is a straight line, an orthographic projection of each of the second signal lines on a surface of the display liquid crystal panel facing the light control panel overlaps with an orthographic projection of a corresponding one of the second grid lines on the surface of the display liquid crystal panel facing the light control panel.

13. The display panel according to claim 12, wherein a width of each of the first signal lines in the second direction is larger than a width of each of the second signal lines in the first direction.

14. The display panel according to claim 2, wherein each of the first signal line is a first gate line, each of the second signal line is a first data line, and the first gate line and the first data line are respectively configured to provide a first gate signal and a first data signal that are used for driving liquid crystal molecules in the light control units of the light control panel to rotate;
the grid lines comprise a second grid line and a second data line, and the second grid line and the second data line are respectively configured to provide a second gate signal and a second data signal that are used for driving liquid crystal molecules in the sub-pixel units of the display liquid crystal panel to rotate, or, the grid lines comprise a black matrix.

15. The display panel according to claim 2, wherein the display liquid crystal panel comprises a first base substrate, and the display liquid crystal panel and the light control panel share the first base substrate;
the display liquid crystal panel comprises a display function layer, and the light control panel comprises a light control function layer;
the display function layer is on a first side of the first base substrate, the light control function layer is on a second side of the first base substrate, and the second side is opposite to the first side.

16. A display device, comprising:
a backlight unit and the display panel according to claim 2, wherein the backlight unit is on a side of the display panel that is close to the light control panel.

17. A display panel, comprising a display liquid crystal panel and a light control panel that are stacked,
wherein the display liquid crystal panel comprises a plurality of grid lines, and the plurality of grid lines comprise a plurality of first grid lines extending along a first direction and a plurality of second grid lines extending along a second direction, the first direction intersects with the second direction, and the plurality of first grid lines and the plurality of second grid lines define a plurality of sub-pixel units;
the light control panel is configured to allow backlight to illuminate into the display liquid crystal panel through the light control panel, and comprises a plurality of signal lines; the plurality of signal lines comprise a plurality of first signal lines extending along the first direction and a plurality of second signal lines extending along the second direction, and the plurality of first signal lines and the plurality of second signal lines define a plurality of light control units;
each of the second signal lines is the fold line and comprises a plurality of second fold line units periodically arranged,
one of the second fold line units corresponds to one of the light control units, or one of the second fold line units corresponds to two of the light control units;
each of the second fold line units comprises a first portion and a second portion sequentially arranged along the second direction, and the first portion of the second fold line unit comprises a first terminal connected to the second portion of the second fold line unit, and the second portion of the second fold line unit comprises a first terminal connected to the first portion of the second fold line unit.

18. The display panel according to claim 17, wherein the first portion and the second portion of at least one of the plurality of second fold line units are symmetrical with respect to a symmetry axis along the first direction.

19. The display panel according to claim 17, wherein the first portion of the second fold line unit has a third angle with respect to the second direction,
the second portion of the second fold line unit has a fourth angle with respect to the second direction, and both a range of the third angle and a range of the fourth angle are less than 7°.

20. The display panel according to claim 17, wherein an orthographic projection of one of the second signal lines on a surface of the display liquid crystal panel facing the light control panel intersects with an orthographic projection of one of the plurality of second grid lines on the surface of the display liquid crystal panel facing the light control panel, and a second terminal of the first portion of the second fold line unit and a second terminal of the second portion of the second fold line unit overlap with the one of the plurality of second grid lines in a direction perpendicular to the surface of the display liquid crystal panel facing the light control panel.

* * * * *